United States Patent [19]
Stephany et al.

[11] Patent Number: 5,933,671
[45] Date of Patent: Aug. 3, 1999

[54] CAMERA WITH TOUCH SENSITIVE SWITCH

[75] Inventors: Thomas M. Stephany, Churchville; Kenneth M. Haas, Oakfield, both of N.Y.

[73] Assignee: Eastman Kodak Company, Rochester, N.Y.

[21] Appl. No.: 09/111,296

[22] Filed: Jul. 7, 1998

[51] Int. Cl.⁶ .................................................. G03B 17/02
[52] U.S. Cl. .............................. 396/535; 396/6; 200/5 A; 200/600
[58] Field of Search .................................. 396/502, 263; 200/305, 502, 600

[56] References Cited

U.S. PATENT DOCUMENTS 3,715,540  2/1973  Larson .
3,728,501  4/1973  Larson et al. .
3,944,843  3/1976  Vaz Martins .
5,086,313  2/1992  Misawa .
5,403,980  4/1995  Eckrich .

*Primary Examiner*—Michael L. Gellner
*Assistant Examiner*—Lee S. Lum
*Attorney, Agent, or Firm*—Roger A. Fields

[57] ABSTRACT

A touch sensitive electronic switch for a camera comprises a pair of front and rear cover parts of the camera that constitute separate electrical conductors which when temporarily bridged by one's hand allow a direct current path between the front and rear cover parts, and an insulator configured to fill a space between the front and rear cover parts in order that the front and rear cover parts and the insulator together define a housing for the camera.

4 Claims, 3 Drawing Sheets

CAMERA WITH TOUCH SENSITIVE SWITCH

FIELD OF THE INVENTION

The invention relates generally to the field of photography, and in particular to cameras. More specifically, the invention relates to a camera with a touch sensitive electronic switch comprising a pair of spaced electrical conductors which are adapted to be temporarily bridged by one's hand to allow a direct current path between the conductors.

BACKGROUND OF THE INVENTION

Touch sensitive electronic switches that have no moving parts and comprise a pair of spaced electrical conductors which are adapted to be temporarily bridged by one's hand to allow a direct current path between the conductors, i.e. to close the switch, are known in the prior art. See U.S. Pat. No. 5,403,980 issued Apr. 4, 1995, No. 3,944,843 issued Mar. 16, 1976, No. 3,728,501 issued Apr. 17, 1973, and No. 3,715,540 issued Feb. 6, 1973.

U.S. Pat. No. 5,403,980, No. 3,944,843, No. 3,728,501, and No. 3,715,540 are incorporated in this application.

SUMMARY OF THE INVENTION

A touch sensitive electronic switch for a camera comprising:

a pair of front and rear cover parts of the camera that constitute separate electrical conductors which when temporarily bridged by one's hand allow a direct current path between the front and rear cover parts; and an insulator configured to fill a space between the front and rear cover parts in order that the front and rear cover parts and the insulator together define a housing for the camera.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
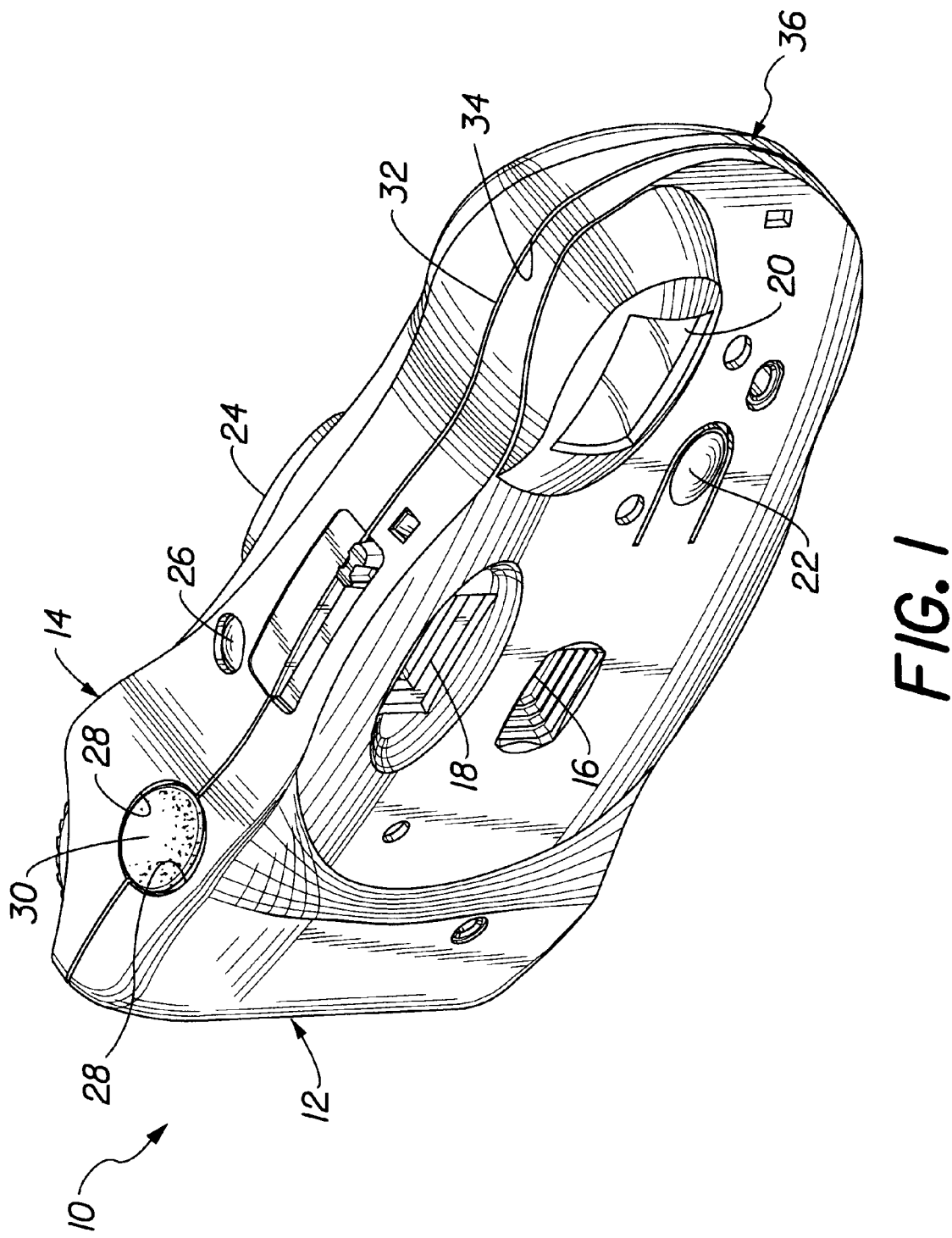
FIG. 1 is a front perspective view of a camera with a touch sensitive electronic switch.
Figure 2:
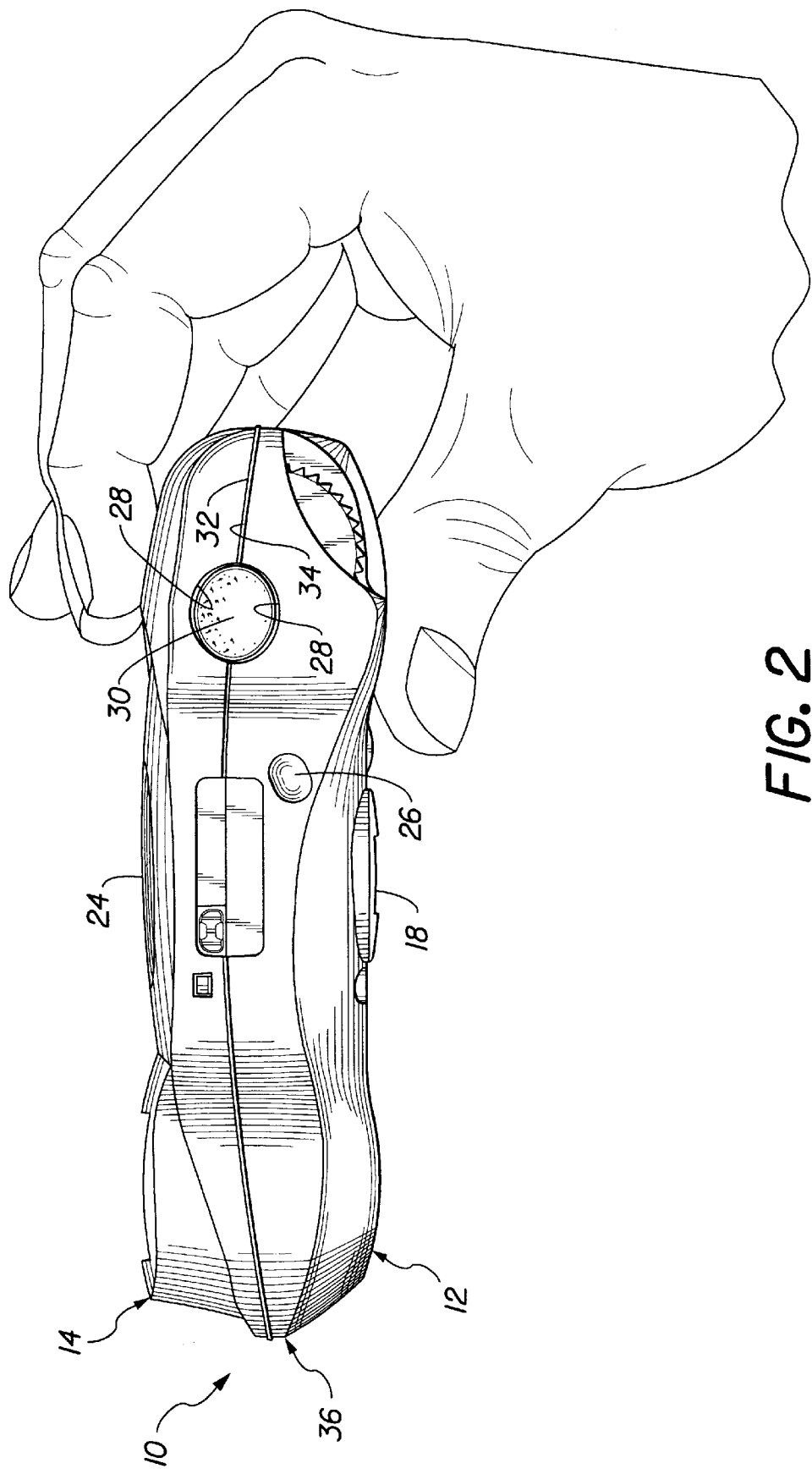
FIG. 2 is a top plan view of the camera with the touch sensitive electronic switch.

Referring now to the drawings, FIGS. 1 and 2 partially show a camera 10 including a pair of opaque front and rear cover parts 12 and 14. The front cover part 12 has a taking lens opening 16, a front viewfinder opening 18, a flash window opening 20, and an integral cantilevered flash "on" button 22. The rear cover part 14 has a rear viewfinder opening 24 and an exposure counter window 26. Both of the cover parts 12 and 14 have a shared opening 28 for a shutter release button 30.

The front and rear cover parts 12 and 14 constitute separate electrical conductors which when temporarily bridged by one's hand, as shown in FIG. 2, allow a direct current path between the front and rear cover parts. Preferably, the front and rear cover parts 12 and 14 are a known type of electrically conductive plastic, although they can be made from any suitable light-weight electrically conductive material such as aluminum. An opaque insulator 32 is configured to fill a narrow longitudinal space 34 between the front and rear cover parts in order that the front and rear cover parts and the insulator together define an opaque housing 36 for the camera 10. Preferably, the insulator 32 is a non-conductive plastic, although it can be made from any suitable non-conductive material such as rubber.

Figure 3:
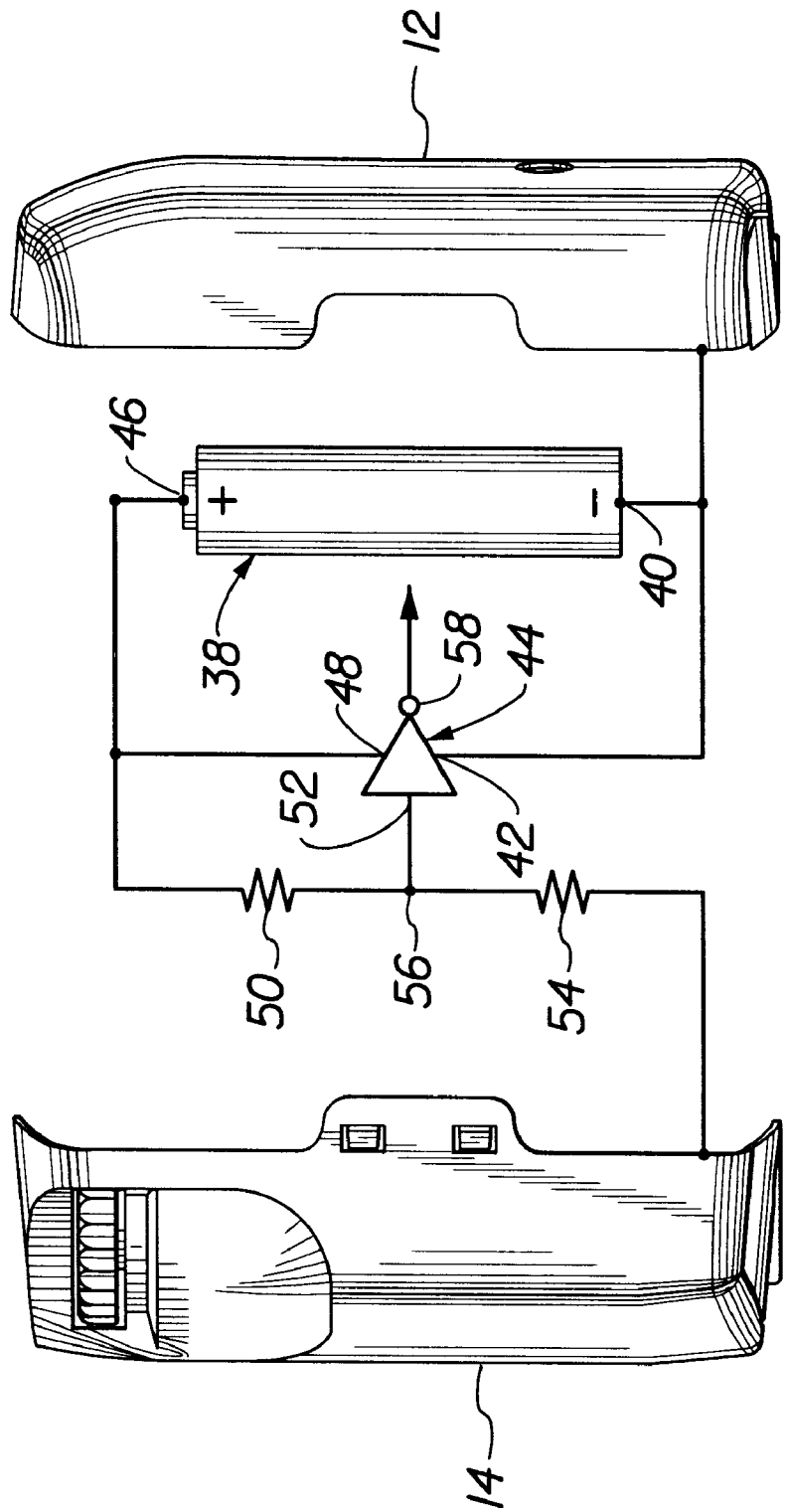
FIG. 3 is a circuit diagram.

As shown in FIG. 3, a conventional six-volt lithium battery 38 has its negative (−) end 40 electrically connected to the front cover part 12 and to a ground side ($V_{SS}$) 42 of a conventional type "4049" CMOS (complementary metal oxide semiconductor) inverter 44 and its positive (+) end 46 electrically connected to a DC supply side ($V_{DD}$) 48 of the CMOS inverter. The CMOS inverter 44 is available from Motorola Inc. as part no. MC14049UB. A first non-variable (fixed) resistor 50 is electrically connected to the positive end 46 of the battery 38 and to an input gate 52 of the CMOS inverter 44. A second non-variable resistor 54 in series with the first resistor 50 is electrically connected to the rear cover part 14 and to the input gate 52 of the CMOS inverter 44. The two-resistors 50 and 54 are electrically connected to the input gate 52 of the CMOS inverter 44 via a common node 56. The resistance value of the first resistor 50 is higher than the resistance value of the second resistor 54.

OPERATION

When the front and rear cover parts 12 and 14 are not temporarily bridged by one's hand, the full voltage of the battery 38 is applied to the input gate 52 of the CMOS inverter 44. As is typical, little or no voltage is provided at an output gate 58 of the CMOS inverter 44. This is equivalent to a switch being open.

When the front and rear cover parts 12 and 14 are temporarily bridged by one's hand, less than one-half of the full voltage of the battery 38 is applied to the input gate 52 of the CMOS inverter 44. The reason for this is that the second resistor 54 is now electrically connected to the negative end 40 of the battery 38, and the resistance ratio of the first resistor 50 to the second resistor is chosen so that no more than less than one-half of the full voltage of the battery 38 can be applied to the input gate 52 of the CMOS inverter. The application of less than one-half of the full voltage of the battery 38 to the input gate 52 of the CMOS inverter 44 permits the full voltage of the battery to be provided at the output gate 58 of the CMOS inverter. This is equivalent to a switch being closed.

The output gate 58 of the CMOS inverter 44 is electrically connected to a known microprocessor (not shown) which turns the camera 10 "on" when the full voltage of the battery 38 is provided at the output gate of the CMOS inverter.

The invention has been described with reference to a preferred embodiment. However, it will be appreciated that variations and modifications can be effected by a person of ordinary skill in the art without departing from the scope of the invention. For example, U.S. Pat. No. 5,403,980, No. 3,944,843, U.S. Pat. No. 3,728,501, and U.S. Pat. No. 3.715,540 incorporated in this application show other examples of touch sensitive electronic switches.

PARTS LIST 10. camera
12. front cover part 14. rear cover part
16. taking lens opening
18. front viewfinder opening
20. flash window opening
22. flash "on" button
24. rear viewfinder opening
26. exposure counter window
28. shared opening
30. shutter release button
32. insulator
34. narrow longitudinal space
36. housing
38. battery
40. negative end
42. ground side
44. CMOS inverter
46. positive end
48. supply side
50. first resistor
52. input gate
54. second resistor
56. common node
58. output gate

What is claimed is:

1. A touch sensitive electronic switch for a camera comprising:
 a pair of front and rear cover parts of the camera that constitute separate electrical conductors which when temporarily bridged by one's hand allow a direct current path between said front and rear cover parts; and
 an insulator configured to fill a space between said front and rear cover parts in order that said front and rear cover parts and said insulator together define a housing for the camera.

2. A touch sensitive electronic switch for a camera as recited in claim 1, wherein said front cover part has a taking lens opening and a front viewfinder opening, and said rear cover part has a rear viewfinder opening.

3. A touch sensitive electronic switch for a camera as recited in claim 1, wherein said front and rear cover parts are conductive plastic.

4. A touch sensitive electronic switch for a camera as recited in claim 1, wherein said front and rear cover parts are each electrically connected to a battery.

* * * * *